United States Patent [19]

Wallouch

[11] 3,976,496
[45] Aug. 24, 1976

[54] LOCKING PITCH FOR PITCH RESERVOIR NIPPLES

[75] Inventor: Rudolph W. Wallouch, Lewiston, N.Y.

[73] Assignee: Airco, Inc., Montvale, N.J.

[22] Filed: Oct. 3, 1974

[21] Appl. No.: 511,851

Related U.S. Application Data

[63] Continuation of Ser. No. 302,435, Oct. 31, 1972, abandoned.

[52] U.S. Cl. .................. 106/123 LC; 106/283; 106/284
[51] Int. Cl.² .................. C08L 97/02; C08L 95/00
[58] Field of Search .................. 106/123, 283, 284

[56] References Cited
UNITED STATES PATENTS

| | | | |
|---|---|---|---|
| 1,221,259 | 4/1917 | Woddrop | 106/123 R |
| 1,699,294 | 1/1929 | Hoskins | 106/123 R |
| 3,303,031 | 2/1967 | Shields | 106/283 |

Primary Examiner—Theodore Morris
Attorney, Agent, or Firm—Edmund W. Bopp; H. Hume Mathews

[57] ABSTRACT

A locking pitch composition for depositing within the pitch reservoir of graphite nipples of the type including such voids. The composition is a heat-foamable, thermoplastic material including particulate pitch in a lignin sulfonate-based binder. The composition may be deposited into the reservoirs of the nipples by direct extrusion at ambient temperatures. When a nipple thus prepared is utilized in an electrode joint assembly, the high temperatures provided at the electrode joint foam the composition to expand it into adjacent thread spaces at the joint. Continued heating then carbonizes the composition to lock the joint.

5 Claims, No Drawings

LOCKING PITCH FOR PITCH RESERVOIR NIPPLES

This is a continuation, of application Ser. No. 302,435, filed Oct. 31, 1972 now abandoned.

BACKGROUND OF INVENTION

This invention relates generally to carbon and graphite electrode joints, and more specifically to the carbon and graphite nipples which are commonly used to assemble such joints.

Carbon or graphite electrodes of the type utilized in electric furnaces and similar metallurgical environments are consumed in use thereof, and accordingly electrodes are normally formed from abutting electrode sections which are interconnected by a nipple internally threaded into each of the adjoining sections. In order to assure electrical and mechanical integrity of the resultant joint, various methodology has been developed, the objective of which is to provide some type of cementing action at at least a portion of the thread clearance spaces whereat the nipple engages the abutting electrodes.

According to one of the most common and highly successful techniques used, a reservoir is formed at the connecting nipple during manufacture thereof and/or at one or more portions of the abutting electrode sections. A cementitious composition, most commonly pitch, is deposited in such voids prior to formation of an electrode joint. Upon the formed joint being thereafter subjected to heating, the composition as, for example, the cited pitch, flows from its reservoir into some of the adjacent thread clearance spaces, where it subsequently is carbonized by further heating as to provide a permanent bond having both good electrical and mechanical properties. Nipples of the reservoir-containing type thus referred to, are shown, for example in U.S. Pat. Nos. 2,510,230; 2,735,705; 2,941,828; 2,941,829 and 3,419,296. The various nipple configurations shown in these exemplary disclosures may include, for example, bored radial recesses extending inwardly from the nipple periphery, or other configurations of cavities in which the so-called locking pitch, may be deposited.

As has already been indicated, the most common composition for use with reservoir nipples has indeed been pitch itself, which commonly is deposited within the reservoirs by heating the pitch to a temperature rendering it fluid, and then allowing the molten material to flow into the reservoir where it subsequently rehardens. This technique of preparing the nipple product is, however, undesirable from a number of viewpoints. Not only, for example, must relatively cumbersome and costly heating and handling equipment be thus used, but moreover large quantities of noxious and toxic fumes are generated in the process — which constitute a danger both to the workmen and to the community at large. In addition the corrosive action of the molten pitch severely limits the useful life of the equipment. Furthermore, the resultant nipple product is less than satisfactory in that the distribution of the redeposited pitch upon subsequent melting is not entirely predictable, depending primarily upon random flow provided during the melting process.

It may be noted that within recent years compositions other than pitch alone, have been proposed for use with the reservoir-type nipples cited above. For example, in U.S. Pat. No. 3,624,011, a cement is disclosed based upon a mixture of hardenable synthetic resin with pitch and dextrin. However, in this composition, as well as similar compositions, it is contemplated that the binder constitute a thermosetting material. This, in turn, impedes the flow and redepositing sequence which is sought to be obtained upon heating of the composition.

It has from time to time also been proposed that the distribution problem cited above may be alleviated by a use of agents in the composition which serve to expand the composition upon heating, thereby forcing such composition into the thread clearance spaces. For example, in U.S. Pat. No. 3,140,967, a technique is disclosed wherein a dissolvable plastic bag is positioned at alternate ends of the nipple in an electrode assembly. During heating the bag ruptures, releasing the cementitious material. The latter includes a swelling agent which presumably acts as set forth above. The composition utilized, however, similar to that mentioned in the prior paragraph, is thermosetting, and in fact it is contemplated that the surfaces to be cemented be pre-impregnated with a catalyzer to promote hardening. The effect of this arrangement is one of counteracting the very augmentation of flow which is sought to be achieved by the swelling agent. Placing the materials at the indicated alternate ends of the nipple, moreover, is found in practice to be a relatively ineffective situs for enabling an effective distribution.

In accordance with the foregoing, it may be regarded as an object of the present invention, to provide a locking pitch composition for depositing within the pitch reservoir of carbon or graphite nipples of the type including such voids, which composition is heat-foamable and thermoplastic, enabling excellent distribution of such material upon use of a thus-prepared nipple in a high temperature electrode assembly environment.

It is a further object of the present invention, to provide a locking pitch composition which may be deposited within the pitch reservoir of graphite nipples of the type including such voids, by direct and simple extrusion techniques, thereby eliminating the costly and cumbersome operations required to deposit such locking compositions in the past, and moreover eliminating the toxic and noxious fumes which are incident to the melting and pouring techniques of the prior art.

It is a further object of the present invention to provide a method for formation of a superior carbon electrode joint, wherein the pitch reservoir of the nipple used in such joint is filled by a simple extrusion technique which may be conducted at ambient temperatures with a material that will harden to be fully retained in the nipple reservoir prior to use and will flow and expand during use.

It is a further object to provide a locking pitch composition having a high coking value and which is substantially free of shrinkage when exposed to furnace temperatures.

It is a still further object of the invention, to provide a locking pitch composition, and method for use thereof which yields electrode joints displaying superior mechanical properties with respect to both strength and performance under flexure and thermal stress.

SUMMARY OF INVENTION

Now, in accordance with the present invention, the foregoing objects, and others as will become apparent in the course of the ensuing specification, are achieved by a locking pitch composition including particulate pitch in a lignin sulfonate-based binder. The composition is heat-foamable and thermoplastic, and at ambient temperatures may be directly extruded or otherwise deposited in the reservoir of a nipple provided with such voids. In the form thus deposited into the said reservoirs the composition is of putty-like consistency and has sufficient mechanical strength to retain itself within the reservoir. Upon subsequent exposure to air, as by storage of the nipples, the said composition may dry out and harden, at at least surface portions thereof, but does not substantially shrink — as do certain gels of the prior art. When the nipple is subsequently subjected to the high temperature environment of an electrode assembly, the heat-foamable and thermoplastic properties of the said composition drive the then fluid material into adjacent thread clearance spaces present at the electrode assembly in which such nipple is employed. Further heating of the assembly in the furnace environment converts the composition by pyrolysis into pitch coke, providing a bond of both excellent mechanical and electrical properties.

DESCRIPTION OF PREFERRED EMBODIMENT

In accordance with the present invention, the locking pitch composition includes as a dispersed phase a particulate pitch. The said material may, for example, comprise a milled No. 30 medium coal tar pitch. It is to be understood that other pitches may be employed including, but not limited to, pitches having softening points between 90°C and 180°C. While the milled pitch is preferred, pitch in other particulate form may also be utilized as, for example, a so-called prill pitch, the latter being a form wherein individual particles are relatively spherical, or pellet pitch. For example, a prill pitch is thus available as an 8 mesh product, wherein the particles have an average diameter of 2.38 mm.

The binder utilized in the present invention is a lignin-sulfonate-based composition, such as the several wood-derived products of this type available from the Crown Zellerbach Corp., Camas, Wash., under the trademark Orzan. These materials are well-known surface-active chemicals which have been utilized for many years in commercial applications, as dispersants, binders, emulsifiers, etc. The materials identified constitute a lignin sulfonate together with wood sugars. Preferably, for example, the binder utilized in accordance with the invention comprises ammonium lignin sulfonate plus wood sugars. Other utilizable variations upon this binder comprise sodium lignin sulfonate and wood sugars, and calcium lignin sulfonate together with wood sugars. A product of the last-mentioned type, usable for example in the present invention, is available from the Marathon Division of American Can Company, Rothschild, Wisconsin, under the designation "Norlig".

The binder compositions cited are instrumental in providing the excellent results achieved in accordance with the invention. These materials in the first instance, gel after admixture thereof with the particulate component and water, and thereby hold the pitch in relatively uniform suspension. Upon subsequent heating the organics constituting the binder decompose and the thereby generated gases (including water vapor) in turn generates a foam which carries the particulate pitch from the reservoir. Upon further continued heating the binder (which has about 20% coking value) is transformed into a glassy carbon, lending added strength and hardness to the ultimate bond formed at the joint.

The compositions utilized in accordance with the invention may be prepared by adding the lignin sulfonate-based binder to the particulate pitch, and mixing these materials with a sufficient quantity of water as to yield a desired consistency for the particular mode and place of application. In all cases the composition is such that it can be inserted in the nipple reservoir at ambient temperature. Generally about 15–35 parts by weight of the binder are utilized in the composition, together with about 10–30 parts by weight of water, to each 100 parts by weight of pitch — which constitutes the balance of the composition. The water content is basically varied in order to provide a desired consistency, as indicated, and the amount of water utilized will in part depend upon the water content of the pitch itself. Since, in the course of use the composition is most commonly provided to nipple reservoirs by direct extrusion, and since furthermore the nipple may then be stored for a considerable period prior to use thereof, the consistency of the composition is of some significance. Where the lower limit of the binder range is exceeded one begins to approach a point at which the strength of the gel-like material is too low to be held in place in the nipple reservoir. Similarly, where the upper limit of the binder range is exceeded, insufficient carbon begins to be present in the composition to provide a satisfactory bond when the nipple is later utilized.

The stated composition need not be applied by extrusion, but any simple filling technique can be used for forcing the material within the cavities of the nipple. However, the use of extrusion methods is particularly simple, especially in that numerous extrusion guns, including hand-held varieties thereof, are known in the art which are found to be ideally adapted for handling and dispensing the present material. The guns of this type do not per se constitute the present invention, but are well-known for application of lubricants and other flowable but relatively viscous materials. They commonly include a nozzle and adjoined barrel wherein a manually-advanced or a motor-driven conveyor in the barrel serves to feed the extruded material from the nozzle tip to the desired utilization point.

Once the material is thus deposited into a nipple reservoir the composition tends to air dry and harden, at least at the exposed surface portions thereof, particularly of course if the nipple is stored for any considerable period. Subsequently, when the nipple is utilized to form an electrode joint of the type described otherwise herein, it is found that upon subjection to heating the composition rapidly regains its flowable properties. At the same time gases are generated by vaporization of contained water, and by decomposition of the several organics, including the sulfonate. A resultant foaming ensues which, in consequence, drives the now thermoplastic material outwardly from its reservoir and into adjacent thread spaces. This foaming action is such that the material is thus driven into place before substantial carbonization appears to occur.

In the above connection it is important to observe that it is highly significant for the instant application that the degree of penetration into the various thread clearance spaces be controlled. In particular it is known to those skilled in the present art that where an extremely limited distribution of the cementatious reservoir material into the thread clearance spaces is achieved, a relatively ineffective locking of the joint is effected. On the other hand, it is also well known that it is equally undesirable to fill too many of the clearance spaces in this manner, as it is possible under the latter conditions to introduce such excessive rigidity into the joint that no accommodation is provided for normal thermal expansion and shock — with a resultant over-sensitivity to damage in the joint. In accordance with the present invention it is found that the composition set forth appears to yield in use an idealized combination in the sense that sufficient volumes of the thread spaces are filled as to provide a highly effective locking action, without at the same time so thoroughly inundating all the thread spaces so as to produce the rigidity problem cited. The effectiveness of the locking action is augmented in accordance with the invention by the very excellent physical characteristics of the bond which is achieved by use of the compositions set forth.

The manner in which the compositions of the present invention are prepared, and tests to ascertain certain properties and/or characteristics of the novel compositions are further illustrated by the following examples:

EXAMPLE I

A composition in accordance with the invention was prepared for this Example which was of pasty consistency and which was capable of being forced at room temperature into the bores of a graphite nipple of the type having a transverse half-inch hole drilled perpendicular to the nipple apex on both ends and in the area of the main contact thread. (These bored holes in past practice have been filled with coal tar pitch.) For the present purpose 100 parts by weight of milled No. 30 medium coal tar pitch were mixed with 25 parts by weight of the previously mentioned Orzan material. The fineness of the pitch was 100% through a 65 mesh screen. The variety of Orzan utilized was so-called Orzan A which is a spray dried powder available from the aforementioned Crown Zellerbach Corp. This product is ammonium lignin-sulfonate plus wood sugars. The two cited components were thoroughly mixed with 25 parts by weight of tap water. The resulting mix was pasty and found to have an unlimited shelf-life if kept moist and stored in plastic bags.

EXAMPLE II

In order to illustrate the heat-flow characteristics of the composition prepared in Example I, a hole ¾ inch in diameter and 2½ inches deep was drilled into a 5 inch × 4 inch graphite plug, and the said composition was utilized to fill the bored hole. The material in the bore was air-dried at room temperature for 12 hours. After the loss of most of the binding water the pasty pitch material turned hard and brittle. Subsequently the graphite plug was transferred into a muffle furnace and heated gradually to 250°C. It was found that the composition ran readily out from the bored hole wherein it resided, at approximately 104°C.

EXAMPLE III

The present Example illustrates the locking ability secured by use of compositions in accordance with the invention. In particular the locking strength of a standard No. 30 medium pitch (cement A) was compared to the extrudable composition of the invention (cement B) and to a prior art composition of the thermosetting type (cement C). The last-mentioned cement is a product well-known to those skilled in the art, and includes pitch and a synthetic resin binder. For this purpose of the tests butt joints were prepared by cementing together a brick (4 inches × 6 inches × 3 inches) of electrode stock and a similarly dimensional brick of nipple stock. The cemented joint was prepared by spreading the putty-like cement B or cement C with a spatula on the 4 inch × 6 inch face of each brick and butting the two pieces together. The regular No. 30 pitch (cement A) had to be heated to 120°C prior to application. The three graphite structures were placed into a metal sagger, packed in coke and sand and baked to 900°C at a rate of 60°/hour. After the bake, the cemented bricks were cut into 1 inch × 1 inch × 6 inch flexural strength samples. Three representative samples of each type were broken across the joint by using fourth point loading techniques.

The samples with cement A as bonding material were very fragile and broke in handling, except one which had a flexural strength of 99 psi and served as control. The three samples bonded by cement B broke in the joint, the maximum strength being 279 psi, the minimum 256, and the average strength 269 psi. The strength values obtained with cement C were below the values obtained with cement B. The maximum strength of cement C-type joints was 229 psi, the minimum 86 psi, and the average strength 151 psi. From these results it is evident that the composition of the present invention (cement B), is more efficient as a filler for nipples of the type having pitch reservoirs therein and surpasses in is locking strength the known prior art products.

EXAMPLE IV

The locking strengths of extrudable pitches prepared in accordance with the present invention were evaluated by measuring the torque required to unwind 20 in. electrode-nipple assemblies. Pursuant to such tests it was found that utilizing Allied Chemical 110°C pitch inserted into the nipple reservoir by the conventional hot melt technique, 3024 ft.-lbs. were required to effect unwinding. Under similar conditions and utilizing a pitch composition similar to that of the prior Examples inserted by extrusion at ambient temperature, 5325 ft.-lbs. of torque were required before the joint could be opened.

While the compositions of the present invention are particularly suitable for application by extrusion or other techniques wherein they are placed in nipple reservoirs, by virtue of their flowable properties at ambient temperatures, they are also useful by other techniques known for application of locking pitches.

While the present invention has been particularly set forth in terms of specific embodiments thereof, it will be evident in view of the present disclosure, that numerous variations upon the invention are now available to those skilled in the art, which variations in propriety yet reside within the scope of the instant invention. Accordingly, the invention is to be broadly construed and limited only by the scope and spirit of the claims now appended hereto.

I claim:

1. A heat-foamable, thermoplastic locking pitch composition extrudable at room temperature and adapted to be deposited within a pitch reservoir of a graphite nipple of the type utilized in joining abutting electrode sections, said composition consisting essentially of (a) a major proportion of finely divided particles of coal tar pitch having a softening point between 90°C and 180°C dispersed in (b) a lignin sulfonate based binder and (c) water, said binder and water collectively constituting a minor proportion of said composition and present in amounts to impart to the composition a consistency that causes the composition to be retained in the nipple reservoir without restraint.

2. A composition according to claim 1, wherein said binder consists of a mixture of a lignin sulfonate selected from one or more members of the group consisting of ammonium, sodium and calcium lignin sulfonates, together with wood sugars.

3. A composition according to claim 2, wherein said pitch is milled.

4. A composition according to claim 2, wherein said binder is present by weight in the range of from about 15 to 35 parts, and water in the range by weight of from about 10 to 30 parts, per each 100 parts of pitch comprising the balance of said composition.

5. A composition according to claim 4, wherein said sulfonate is ammonium lignin sulfonate.

* * * * *